Oct. 18, 1966

H. REINSCH 3,279,347

AUTOMATIC DIAPHRAGM ASSEMBLIES FOR CAMERAS

Filed June 26, 1964

INVENTOR
Herbert Reinsch
by
Michael J. Striker

United States Patent Office 3,279,347
Patented Oct. 18, 1966

3,279,347
AUTOMATIC DIAPHRAGM ASSEMBLIES
FOR CAMERAS
Herbert Reinsch, Stuttgart, Germany, assignor to Eugen Bauer G.m.b.H., Stuttgart-Unterturkheim, Germany
Filed June 26, 1964, Ser. No. 378,105
Claims priority, application Germany, June 28, 1963,
B 72,465
9 Claims. (Cl. 95—64)

The present invention relates to cameras.

More particularly, the present invention relates to automatic diaphragm aperture determining assemblies of cameras.

In assemblies of this type it is conventional to provide, for example, a pair of diaphragm blades coupled to each other in such a way that they turn equally and oppositely through predetermined angles so as to provide different diaphragm apertures and one of these blades is operatively connected with the moving coil of a galvanometer which measures the light intensity so that in this way a simple structure will automatically determine the diaphragm aperture according to the light intensity.

The coupling between such a pair of diaphragm blades generally includes a pin and slot which have tolerances which must be great enough so that it is not possible for the pin which is connected to one of the blades to become jammed in the slot formed in the other of the blades, so that in this way free movement of the pin and slot relative to each other is guaranteed. However, these tolerances result in so much play of the pin in the slot that uncontrollable vibrations of the blades result, and, particularly at small diaphragm apertures, improper exposures will be made as a result of these vibrations.

It is accordingly a primary object of the present invention to provide a diaphragm assembly of the above type which will not be subject to vibrations due to play of a pin in a slot at the coupling between a pair of diaphragm blades.

A further object of the present invention is to provide a structure which will eliminate these vibrations without in any way influencing the operation of a galvanometer from which the movement of the diaphragm blades is derived.

It is in addition an object of the present invention to accomplish the above with a structure which is exceedingly simple and which takes advantage of elements which are used for other purposes so that the number of elements required for the specific purposes of the present invention is a minimum.

An additional object of the present invention is to provide a structure which will reliably maintain the parts in an operating condition even if the camera is subjected to shocks or vibrations of considerable magnitude.

With the above objects in view the invention includes, in a camera, a photosensitive means and a measuring means connected to the photosensitive means for measuring the intensity of light which impinges on the photosensitive means, this measuring means including a magnetic core and a moving coil which assumes a position determined by the light intensity. A motion transmitting means interconnects the moving coil of the measuring means with a first diaphragm blade for moving the latter in response to movement of the moving coil to a position also determined by the light intensity, and the aperture is determined by this first diaphragm blade in cooperation with a second diaphragm blade which overlaps the first diaphragm blade. One of these blades has an elongated control edge and the other of the blades carries a pin which engages the control edge, while a support means supports the blades for movement relative to each other to positions where the blades overlap each other to different extents providing different apertures. The movement of the first blade in response to movement of the moving coil is transmitted to the second blade through the engagement of the control edge and pin so that in this way the second blade moves simultaneously with the first blade to provide the various aperture sizes. This pin could move away from the control edge except for the fact that according to the present invention one of the blades carries a magnetic member located in the magnetic field of the magnetic core of the measuring means to be magnetically acted upon by the magnetic core for urging the blade which carries the magnetic member to move in a direction maintaining the control edge and pin in engagement with each other, so that with the structure of the invention although the pin is in no way confined within relatively small limits within a slot it is nevertheless maintained in engagement with the control edge through a magnetic member which according to the invention is located in the magnetic field of the magnetic core which is required in any event to form part of the measuring means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
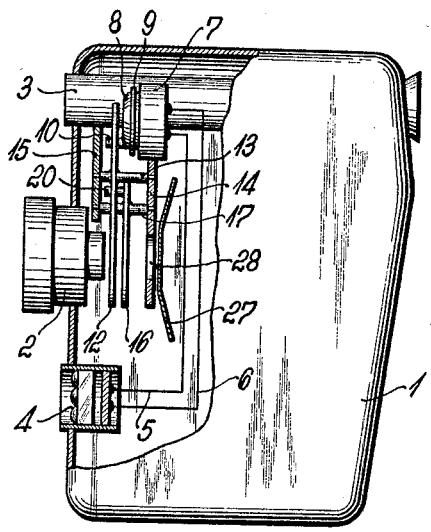
FIG. 1 is a side elevation of a camera which includes the structure of the invention, the housing of the camera of FIG. 1 being broken away to show diagrammatically and partly in section how the structure which pertains to the present invention is arranged in the camera.
Figure 2:
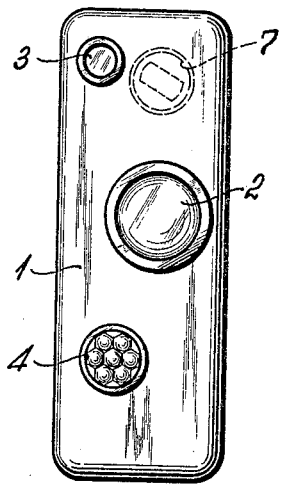
FIG. 2 is a front view of the camera of FIG. 1.

Referring now to the drawings, the camera illustrated therein is a motion picture camera, although it is to be understood that the structure of the invention is equally applicable to still cameras. The housing 1 of the camera carries in a conventional manner an objective 2 and a viewfinder 3. In addition, the housing 1 carries a photosensitive means 4 which in the illustrated example is a photocell, although a photosensitive resistor could be used if desired. This photosensitive means 4 is electrically connected, by the conductors 5 and 6, to a measuring means 7 which measures the intensity of the light which impinges on the photocell 4. This measuring means 7 can take the form of a galvanometer the moving coil of which will, as is well known, assume angular positions determined by the intensity of the light which reaches the photosensitive means 4.

Figure 3:
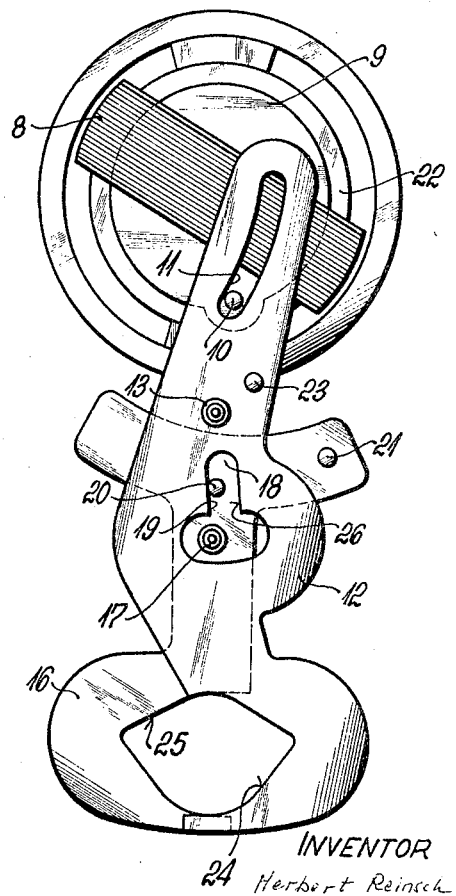
FIG. 3 shows in elevation, on an enlarged scale, as compared to FIGS. 1 and 2, one possible embodiment of a diaphragm assembly according to the present invention.

The illustrated diaphragm includes a diaphragm blade 12 supported by a pivot means 13 for turning movement about an axis parallel to the optical axis, the pin 13 extending between and being carried by parallel interior stationary walls 14 and 15 of the camera, as shown in FIG. 1. The moving coil 8 of the measuring means 7 is indicated in FIGS. 1 and 3, and FIG. 3 shows a motion transmitting means which transmits the movement of the moving coil 8 to the blade 12 so as to move the latter to a position determined by the lighting conditions. As is apparent from FIG. 3 a plate 9 is carried by the moving coil 8 for angular movement therewith, and a pin-and-slot connection 10, 11 transmits the turning of the moving coil to the blade 12 for swinging the latter about the support means 13. As may be seen from FIG. 3 the pin 10 is fixedly carried by the disc 9 and extends into an elongated slot 11 formed in the blade 12, so that the angular position of the blade 12 with respect to the pivot axis provided by the pivot means 13 will be determined by the angular position of the moving coil 8.

The diaphragm includes a second blade 16 supported by a pivot means 17 for turning movement about a pivot axis parallel to that provided by the pivot means 13 for the blade 12, and it will be seen from FIG. 1 that pivot pin 17 is also supported by the stationary walls 14 and 15. Thus, the blades 12 and 16 overlap each other and are supported by support means 13, 17 for movement to positions where the blades overlap each other to different extents so as to provide apertures of different sizes.

The blade 12 is formed with a cutout 18 which on the one hand enables the blade 12 to clear the pivot pin 17 and which on the other hand has an upper elongated portion, as viewed in FIG. 3, situated between the pivots 13 and 17 and including at its left, as viewed in FIG. 3, an elongated control edge 19. This control edge 19 is engaged by pin 20 which is fixed to the blade 16, and thus the turning of the blade 12 by the moving coil of the measuring means 7 will be transmitted through the control edge 19 and the pin 20 to the blade 16 for turning the latter equally and oppositely to the blade 12. The pin 20 is also carried by a portion of the blade 16 which is situated between the pivot axes provided by the pair of pivot means 13 and 17, and furthermore it will be seen that the elongated portion of cutout 18 in which the pin 20 is situated is defined on the one hand by the control edge 19 and on the other hand by an elongated edge 26 which is substantially parallel to the edge 19 and which is spaced therefrom by a distance which is considerably greater than the diameter of the pin 20.

In order to maintain the pin 20 in engagement with the control edge 19 there is provided, in accordance with the present invention, a magnetic member 21 in the form of a ferromagnetic pin, plate, or the like, and this magnetic member 21 is situated within the magnetic field of the magnetic core 22 of the measuring means 7 so that in this way magnetic forces derived from the core 22 act on the magnetic member 21, and in fact the member 21 is attracted toward the core 22 so as to urge the blade 16 to turn about the pivot 17 in a counterclockwise direction, as viewed in FIG. 3, so that in this way the pin 20 is urged toward and maintained in engagement with the control edge 19.

Also acting to maintain the control edge 19 and pin 20 in engagement with each other is a magnetic member 23 which may be identical with the magnetic member 21, this magnetic member 23 being carried by the blade 12 and also being situated in the field of the magnetic core 22 so as to be attracted toward the latter, and it will be seen that the members 21 and 23 both have substantially the same angular positions with respect to the pair of pivot means 17 and 13, respectively, so that the magnetic force acting on the member 23 produces through the latter a tendency to turn the blade 12 in the same direction as the blade 16, namely a counterclockwise direction as viewed in FIG. 3, so that in this way the edge 19 is urged toward and maintained in engagement with the pin 20 since elements 19 and 20 are carried by portions of the blades which are situated between the axes provided by the pair of pivot means 13 and 17. Even though the blades are urged to turn in the same direction their portions between these pivot axes tend to turn in opposite directions, the portion of the blade 16 which carries the pin 20 tending to move to the left and the portion of the blade 12 which carries the edge 19 tending to move to the right, as viewed in FIG. 3, so that in this way elements 19 and 20 are indeed reliably maintained in engagement with each other. Moreover, it will be seen that with this arrangement the force with which the element 21 tends to turn the blade 16 is directly opposed by the force with which the element 23 tends to turn the blade 12, so that these forces tend to cancel each other out, and in this way the measuring means 7 is completely insulated from these forces. In other words with this arrangement an edge of the slot 11 will not press against the pin 10, as a result of magnetic forces acting on elements 21 or 23, in a manner which would override whatever position the moving coil 8 correctly assumes in accordance with the light intensity. It is to be noted in this connection that the magnetic member 23 which is situated closer to the core 22 is spaced from the pin 13 by a distance substantially smaller than the distance between the pin 17 and the magnetic member 21 which is at a greater distance from the core 22 than the member 23, so that the member 21 which is more distant from the magnetic core acts through a longer moment arm on the blade 16 than the moment arm through which the member 23 acts on the blade 12, and these moment arms are chosen to compensate for the distances of the magnetic members from the core 22 so that the turning forces applied to the blades by the magnetic members are substantially equal.

The lower ends of the blades 12 and 16 are relatively wide and are provided with the oppositely directed, substantially V-shaped notches 24 and 25 which cooperate to determine the size and configuration of the exposure aperture. This aperture is always symmetrically arranged with respect to the optical axis of the camera, this latter optical axis of course being the optical axis of the objective too. Behind the diaphragm is situated the film gate 28 through which the film 27 is exposed, this film being situated behind the film gate and being advanced in a stepwise manner by a conventional structure which forms no part of the invention and of course various other well known camera elements such as the shutter and the source of power are not illustrated since they do not form part of the invenion.

It is possible in a known way to connect to the moving coil 8 a spring which tends to bring the moving coil and the blade connected thereto into a predetermined end position which may, for example, be the position illustrated in FIG. 3. Instead of such a spring, it is also possible to provide the measuring means 7 with a particular construction which guarantees that the moving coil will assume an angular position determined by the amount of current which flows therethrough.

The blades will maintain their predetermined positions relative to each other, such as the positions shown in FIG. 3, for example, as long as the current derived from the photocell 4 remains below a predetermined value. If a greater amount of light is received by the photosensitive means 4, then the intensity of the current transmitted to the measuring means is increased and the moving coil 8 turns in a counterclockwise direction, as viewed in FIG. 3, so that the pin 10 rides in the slot 11 and engages the right edge thereof, as viewed in FIG. 3, for turning the blade 12 in a clockwise direction tending to displace the edge 19 away from the pin 20. Thus, the notch 24 shifts to the left closer to the optical axis and the size of the aperture is reduced. The pin 20 will at that time follow the edge 19 because of the magnetic attraction of the members 21 and 23 toward the core 22, so that the blade 16 at this time turns about the pin 17 in a counterclockwise direction, as viewed in FIG. 3, causing the notch 25 to approach to the right, as viewed in FIG. 3, toward the optical axis, thus reducing the aperture to the same extent as the reduction provided by the shifting of the notch 24.

It is apparent that the distance between the edges 19 and 26 is so great as compared to the diameter of pin 20, that with the structure of the invention there is in fact no question of providing for the pin 20 a slot which has with respect to the pin 20 just enough clearance to guarantee that there will be no binding. Instead with the invention the above-described magnetic forces act to maintain the pin 20 and the edge 19 in engagement with each other. However, the edge 26 does act as a limiting edge which limits the extent to which the pin 20 can move away from the edge 19. For example, if the camera for any reason happens to be subjected to relatively strong vibratory forces or shocks, it would be possible, were it not for the edge 26, for the blade 16 to be displaced by such a vibration or shock in a clockwise direction about the pin 17, as viewed in FIG. 3, through an angle sufficiently great to locate the member 21 beyond the field of the magnet 22 so that for a while at least the camera structure would not function properly. However, the limiting edge 26 limits the extent to which the pin 20 can move away from the edge 19 to a degree which reliably maintains the member 21 at all times in the magnetic field of the core 22, so that if a sudden force acting on the camera should displace the pin 20 away from the edge 19, such a displacement would be of only substantially instantaneous duration and the structure would immediately return to the condition where the pin 20 engages the edge 19.

It will be understood that each of the elements described above, or two or more together, may also find a useful application in other types of camera differing from the types described above.

While the invention has been illustrated and described as embodied in diaphragm assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, photosensitive means; measuring means electrically connected to said photosensitive means for measuring the intensity of light impinging on said photosensitive means, said measuring means including a magnetic core and a moving coil which assumes a position determined by the light intensity; a first diaphragm blade having a control edge; a second diaphragm blade overlapping said first blade to define a diaphragm aperture therewith, said second diaphragm blade carrying a pin which engages said control edge of said first blade; support means supporting said blades for movement relative to each other to positions where said blades overlap to different extents so as to provide diaphragm apertures of different sizes; motion transmitting means transmitting movement of said moving coil to said first blade so that the position of the latter will be determined according to the lighting conditions, the position of the second blade being determined by engagement of said pin with said control edge; and a magnetic means carried by one of said blades and located in the magnetic field of said core to be urged thereby in a predetermined direction, said magnetic means having on said one blade a position which in response to urging of said magnetic means in said predetermined direction maintains said control edge and pin in engagement with each other.

2. In a camera, in combination, photosensitive means; measuring means operatively connected to said photosensitive means for measuring the intensity of light impinging on said photosensitive means, said measuring means including a magnetic core and a moving coil which assumes a position determined by the light intensity; a pair of diaphragm blades overlapping each other to determine a diaphragm aperture; support means supporting said blades for movement to positions overlapping each other to different extents for providing apertures of different sizes; motion transmitting means transmitting motion of said moving coil to one of said blades for positioning the latter blade according to the light intensity, said blades respectively carrying a pin and a control edge engaged by said pin for determining the position of the other of said blades relative to said one blade which is acted on by said motion transmitting means; and a pair of magnetic means respectively carried by said blades and located in the magnetic field of said core, the positions of said magnetic means on said blades and with respect to said core providing, due to the magnetic forces acting on said pins, forces urging said pin and control edge into engagement with each other so that said pin and control edge are maintained in engagement with each other, and the position of said magnetic means with respect to said blades and core also producing through said blades forces which oppose each other so that said forces tend to cancel each other out and thus insulate said measuring means from the influence of magnetic forces acting on said magnetic means.

3. In a camera, in combination, photosensitive means; measuring means operatively connected to said photosensitive means for measuring the intensity of light impinging thereon, said measuring means including a magnetic core and a moving coil which assumes positions determined by the light intensity; a pair of diaphragm blades overlapping each other to determine the diaphragm aperture; support means supporting said blades for movement to positions overlapping each other to different extents for providing different apertures; motion transmitting means transmitting motion of said moving coil to one of said blades for positioning said one blade according to the light intensity, said one blade being formed with a cutout defined between a pair of edges of said one blade which are located at a predetermined distance from each other, one of said edges being a control edge and the other of said edges being a limiting edge; a pin carried by the other of said blades and located in said cutout in engagement with said control edge to determine the position of said other blade, said pin having a diameter substantially smaller than said distance between said edges and said limiting edge limiting the extent to which said pin can move away from said control edge; and a magnetic means carried by said other blade, positioned in the magnetic field of said core, and being acted on by the magnetic field for urging said other blade in a direction which tends to displace said pin toward said control edge so as to maintain said control edge and pin in engagement with each other.

4. In a camera as recited in claim 3, the distance between said edges being small enough to maintain said magnetic means in the magnetic field of said core if due to shocks or the like said pin should be momentarily displaced from said control edge toward said limiting edge.

5. In a camera, in combination, photosensitive means; measuring means operatively connected to said photosensitive means for measuring the intensity of light impinging on said photosensitive means, said measuring means including a magnetic core and a moving coil which assumes a position determined by the light intensity; a pair of diaphragm blades overlapping each other and located substantially in planes normal to the optical axis, said blades determining the diaphragm aperture; a pair of pivot means respectively pivotally supporting said blades for turning movement about axes parallel to the optical axis to positions overlapping each other to different extents for providing different apertures; pin-and-slot means connecting said moving coil to one of said blades for turning the latter to a position determined by the light intensity, said one blade having an elongated control edge and the other blade carrying a pin engaging said control edge so that the angular position of said other blade will be determined by the angular position of said one blade; and a magnetic means carried by said other blade and located in the magnetic field of said core for urging said other blade in a direction tending to displace said pin carried by said other blade into engagement with the control edge of said one blade, so that said magnetic means acts to maintain said control edge and said latter pin in engagement with each other.

6. In a camera as recited in claim 5, a second magnetic means carried by said one blade in the magnetic field of said core and acting on said one blade to tend to displace said control edge thereof into engagement with said pin carried by said other blade so as to also maintain the latter pin and control edge in engagement with each other, the forces exerted on said blades by said magnetic means opposing each other to insulate said measuring means from the magnetic forces acting on said magnetic means.

7. In a camera, in combination, photosensitive means; measuring means operatively connected to said photosensitive means for measuring the intensity of light impinging on said photosensitive means, said measuring means including a magnetic core and a moving coil which assumes a position determined by the light intensity; a pair of pivot means respectively providing pivot axes which are parallel to each other and to the optical axis of the camera, said pair of pivot means being spaced substantially from each other so that a predetermined space is defined between said pivot axes; a pair of diaphragm blades normal to said pivot axes and respectively supported by said pair of pivot means for turning movement about said pivot axes, said blades overlapping each other to determine the diaphragm aperture according to the angular positions of said blades relative to said pivot axes, respectively, and said blades respectively having portions situated in the space between said pivot axes, one of said blade portions having an elongated control edge and the other of said blade portions carrying a pin engaging said control edge; motion transmitting means transmitting motion of said moving coil to one of said blades for turning the latter, said control edge and pin determining the position of the other of said blades in response to turning of said one blade; and a pair of magnetic means respectively carried by said blades in the magnetic field of said core for urging said blades to turn about said pivot axes, respectively, in the same directions so as to urge said control edge and pin into engagement with each other and so as to provide on said blades forces which oppose each other, whereby said control edge and pin will be maintained in engagement with each other and said measuring means will be substantially insulated from the magnetic forces acting on said pins.

8. In a camera as recited in claim 7, said magnetic means having substantially the same angular positions relative to said pivot axes.

9. In a camera as recited in claim 7, said magnetic means being located at different distances from said core with the magnetic means which is nearer to said core located closer to the pivot axis of the blade which carries the latter magnetic means than the distance between the other magnetic means and the pivot axis of the blade which carries said other magnetic means, so that the magnetic means which is more distant from said core acts through a longer moment arm on the blade carrying the latter magnetic means than the magnetic means which is closer to said core, whereby substantially equal turning forces are applied to said blades to maintain said pin and control edge in engagement with each other.

References Cited by the Examiner

UNITED STATES PATENTS

| 3,062,119 | 11/1962 | Babcock | 95—64 |
| 3,230,856 | 1/1966 | Sho | 95—64 |

FOREIGN PATENTS 1,326,942   4/1963   France.

NORTON ANSHER, *Primary Examiner.*